US012638831B2

(12) United States Patent
Sasaki et al.

(10) Patent No.: US 12,638,831 B2
(45) Date of Patent: May 26, 2026

(54) TOOL SYSTEM, EXTERNAL SYSTEM, DETERMINATION METHOD, AND NON-TRANSITORY STORAGE MEDIUM

(71) Applicant: Panasonic Intellectual Property Management Co., Ltd., Osaka (JP)

(72) Inventors: Takayuki Sasaki, Osaka (JP); Koya Jojima, Osaka (JP); Yuta Hara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 371 days.

(21) Appl. No.: 18/347,344

(22) Filed: Jul. 5, 2023

(65) Prior Publication Data

US 2024/0028001 A1 Jan. 25, 2024

(30) Foreign Application Priority Data

Jul. 20, 2022 (JP) ................................. 2022-115875

(51) Int. Cl.
 *G05B 19/418* (2006.01)
 *B25F 5/00* (2006.01)
(52) U.S. Cl.
 CPC ............ *G05B 19/4183* (2013.01); *B25F 5/00* (2013.01); *G05B 19/4187* (2013.01)
(58) Field of Classification Search
 CPC ............ G05B 19/4183; G05B 19/4187; G05B 19/0425; B25F 5/00; G08C 25/00; G08C 17/02; G08C 25/04
 See application file for complete search history.

(56) References Cited

U.S. PATENT DOCUMENTS 5,245,616 A * 9/1993 Olson ................ H04N 21/6377
370/450
6,701,198 B1 * 3/2004 Vandesteeg ........ G05B 19/0425
713/1

(Continued)

FOREIGN PATENT DOCUMENTS

JP H10-262093 A 9/1998
JP 2000-334670 A 12/2000
JP 2020-203359 A 12/2020

OTHER PUBLICATIONS

Chouikhi, Samira, et al. "Recovery from simultaneous failures in a large scale wireless sensor network." Ad Hoc Networks 67 (2017) : 68-76 (Year: 2017).*

(Continued)

*Primary Examiner* — Christopher E. Everett
(74) *Attorney, Agent, or Firm* — Rimon P.C.

(57) ABSTRACT

A tool system includes a tool and an external system. The tool includes a first communications interface. The first communications interface transmits result information, including a work order number, to the external system with progress of work. The external system includes a second communications interface. The second communications interface receives the result information transmitted from the tool. The external system makes a storage device store the result information received by the second communications interface. At least one of the tool or the external system further includes a determiner. The determiner determines, based on progress information indicating the progress of the work being performed by the tool and the result information stored in the storage device, what part of the result information the second communications interface has failed to receive.

14 Claims, 6 Drawing Sheets

(56)              References Cited

U.S. PATENT DOCUMENTS

| | | |
|---|---|---|
| 10,530,748 B2 * | 1/2020 | Rotvold ............. H04L 63/0209 |
| 10,855,389 B1 * | 12/2020 | Roggendorf ........... H04L 45/20 |
| 2022/0094181 A1 * | 3/2022 | Böhm ................... H01M 10/44 |
| 2022/0221834 A1 * | 7/2022 | Dobashi ............. G05B 19/4183 |

OTHER PUBLICATIONS

First Office Action issued for the corresponding Chinese Patent Application No. 202310829966.5, dated Sep. 5, 2025.

\* cited by examiner

*FIG. 2*

TOOL SYSTEM, EXTERNAL SYSTEM, DETERMINATION METHOD, AND NON-TRANSITORY STORAGE MEDIUM

CROSS-REFERENCE TO RELATED APPLICATIONS

The present application is based upon, and claims the benefit of priority to, Japanese Patent Application No. 2022-115875, filed on Jul. 20, 2022, the entire contents of which are hereby incorporated by reference.

TECHNICAL FIELD

The present disclosure generally relates to a tool system, an external system, a determination method, and a non-transitory storage medium. More particularly, the present disclosure relates to a tool system including a tool with a wireless communication capability, an external system with the capability of communicating with the tool, a determination method to be performed by the tool system, and a non-transitory storage medium stores thereon a program designed to have the determination method performed.

BACKGROUND ART

JP 2000-334670 A discloses an electric tool control system including an electric tool with a wireless communication capability and a center device. The electric tool included in the electric tool control system transmits history of screw fastening work to the center device.

In an electric tool control system (tool system) such as the one disclosed in JP 2000-334670 A, unless wireless communication is established with good stability between the electric tool (tool) and the center device (external system), the center device, for example, may fail to receive the work history (result information).

SUMMARY

The present disclosure provides a tool system, an external system, a determination method, and a non-transitory storage medium, all of which are configured or designed to allow the external system to acquire result information with more reliability, even when wireless communication, which achieves a lower degree of stability than wired communication, is adopted.

A tool system according to an aspect of the present disclosure includes a tool and an external system. The tool includes a first communications interface. The first communications interface transmits result information, including a work order number, to the external system with progress of work. The external system includes a second communications interface. The second communications interface receives the result information from the tool. The external system makes a storage device store the result information received by the second communications interface. At least one of the tool or the external system further includes a determiner. The determiner determines, based on progress information indicating the progress of the work being performed by the tool and the result information stored in the storage device, what part of the result information the second communications interface has failed to receive.

An external system according to another aspect of the present disclosure includes a communications interface, a storage device, and a determiner. The communications interface receives, from a tool, result information indicating a result of work performed by the tool and including a work order number. The storage device stores the result information received by the communications interface. The determiner determines, based on progress information indicating progress of the work being performed by the tool and the result information stored in the storage device, what part of the result information the communications interface has failed to receive.

A determination method according to still another aspect of the present disclosure is designed to be used in a tool system including a tool and an external system. The tool transmits result information, including a work order number, to an external system with progress of work. The external system receives the result information transmitted from the tool and stores the result information in a storage device. The determination method includes a determination step including determining, based on progress information indicating the progress of the work being performed by the tool and the result information stored in the storage device, what part of the result information the external system has failed to receive.

A non-transitory storage medium according to yet another aspect of the present disclosure stores thereon a program designed to cause one or more processors to perform the determination method described above.

BRIEF DESCRIPTION OF DRAWINGS

The figures depict one or more implementations in accordance with the present teaching, by way of example only, not by way of limitations. In the figures, like reference numerals refer to the same or similar elements.

FIG. 2 is a block diagram illustrating a configuration for the tool system;

DETAILED DESCRIPTION

Figure 1:
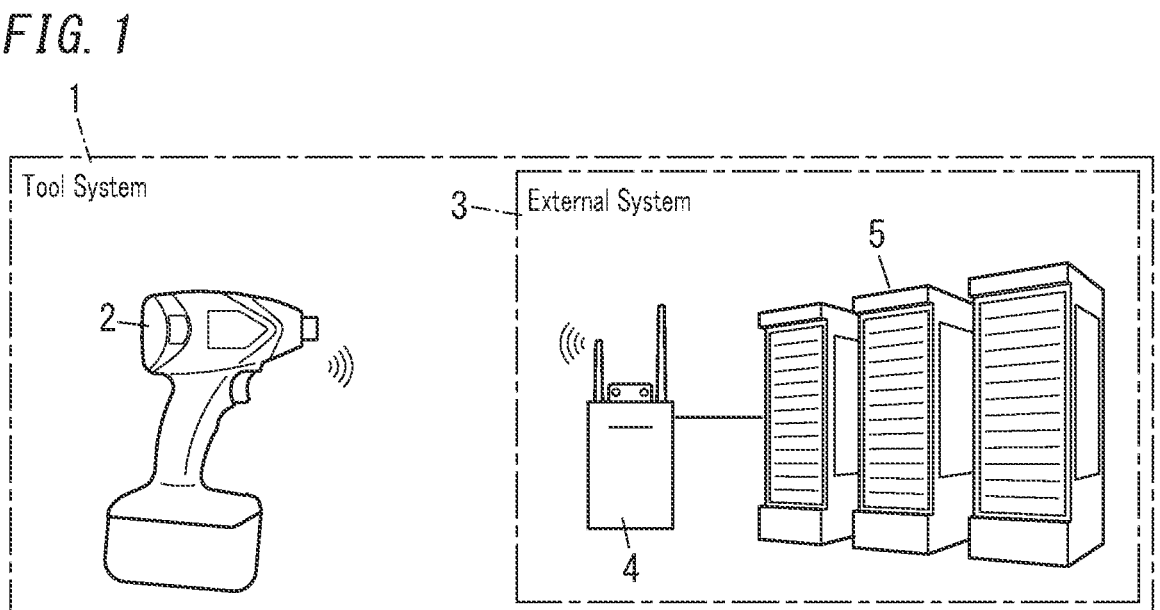
FIG. 1 is a schematic representation illustrating a configuration for a tool system according to a first embodiment.

A preferred embodiment of the present disclosure will now be described in detail with reference to the accompanying drawings. In the following description of embodiments, any pair of constituent elements, having the same function, will be designated by the same reference numeral and description thereof will be omitted herein to avoid redundancy. Note that the embodiments to be described below are only exemplary ones of various embodiments of the present disclosure and should not be construed as limiting. Rather, the exemplary embodiments may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

First Embodiment

(1) Overview

First, an overview of a tool system 1 according to a first embodiment will be described with reference to FIGS. 1-3.

As shown in FIG. 1, the tool system 1 according to the first embodiment includes a tool 2 and an external system 3. The tool 2 and the external system 3 wirelessly communicate with each other.

The tool 2 may be, for example, a portable electric tool such as an impact wrench. As shown in FIG. 1, the tool 2 includes a fastening unit 24 and a first communications interface 25.

The fastening unit 24 performs a fastening operation of fastening a fastening member such as a bolt by driving a tip tool such as a socket 242 (refer to FIG. 3) in rotation.

The first communications interface 25 includes a communications interface for wirelessly communicating with the (external device 4 of the) external system 3. The first communications interface 25 transmits result information, including a work order number, to the external system 3 with the progress of the work.

As used herein, the "work order number" is a sequential number assigned to each session of the fastening operation to be performed by the fastening unit 24. For example, if the fastening unit 24 has fastened three fastening members (i.e., has performed three sessions of the fastening operation), the work order number for the first session of the fastening operation is "1," the work order number for the second session of the fastening operation is "2," and the work order number for the third session of the fastening operation is "3."

Also, as used herein, the "result information" is a piece of information indicating the result of the work performed by the tool 2. The result information includes a piece of information indicating the work order number and a piece of information indicating the fastening torque of the fastening operation.

The external system 3 is a system for managing the work to be performed using the tool 2. The external system 3 according to the first embodiment manages the work to be performed using the tool 2 by transmitting a fastening instruction to the tool 2 and receiving the result information from the tool 2.

As used herein, the "fastening instruction" includes number of workpieces information indicating the number of the fastening members to be fastened by the tool 2 (corresponding to the number of sessions of the fastening operation to perform) and a piece of information indicating the target torque value of the fastening operation. Optionally, the fastening instruction may further include location information indicating the locations of the fastening members to be fastened by the tool 2 and procedure information defining the working procedure.

As shown in FIG. 1, the external system 3 according to the first embodiment includes the external device 4 and a high-order device 5 such as a server.

Figure 2:
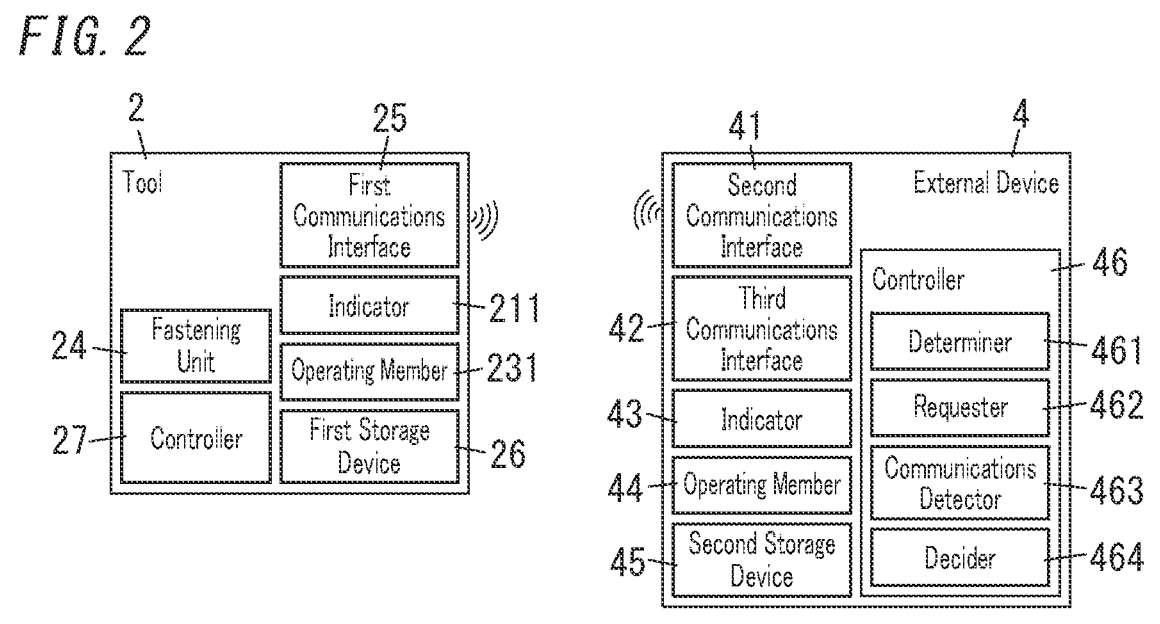

As shown in FIG. 2, the external device 4 includes a second communications interface 41, a second storage device 45, and a determiner 461.

The second communications interface 41 includes a communications interface for wirelessly communicating with the tool 2. The second communications interface 41 receives the result information from the tool 2.

The second storage device 45 stores the result information received by the second communications interface 41.

The determiner 461 determines, based on progress information indicating the progress of the work being performed by the tool 2 and the result information stored in the second storage device 45, what part of the result information the second communications interface 41 has failed to receive.

As used herein, the "progress information" is a piece of information indicating the progress of the work being performed by the tool 2. The progress information according to the first embodiment is a piece of information indicating the work order number assigned to the latest session of the fastening operation performed by the tool 2. For example, if three sessions of the fastening operation have been performed by the tool 2, then the progress information is a piece of information indicating "3" that is the work order number of the latest session of the fastening operation.

The tool system 1 according to the first embodiment may determine what part of the result information is not stored in (i.e., missing from) the second storage device 45 of the external device 4 (of the external system 3), i.e., what part of the result information the second communications interface 41 has failed to receive. Determining what part of the result information the second communications interface 41 has failed to receive allows the external system 3 to request the tool 2 to transmit that missing part of the result information that has not been received yet, thus reducing the chances of the result information having missing parts. In other words, the tool system 1 according to the first embodiment reduces the chances of the external system 3 failing to receive parts of the result information, thus allowing the external system 3 to acquire the result information (such as data about the fastening operation) with more reliability even when wireless communication, which achieves a lower degree of stability than wired communication, is adopted.

(2) Details

Next, a detailed configuration for the tool system 1 according to the first embodiment will be described with reference to FIGS. 1-4.

(2.1) Configuration for Tool System

The tool system 1 according to the first embodiment may be used, for example, in an assembly line on which the user performs assembling work of a workpiece. As shown in FIG. 1, the tool system 1 includes the tool 2 and the external system 3. Optionally, the tool system 1 may include a plurality of tools 2. As described above, the tool 2 and the external system 3 communicate with each other wirelessly.

(2.2) Configuration for Tool

As shown in FIG. 2, the tool 2 according to the first embodiment includes the fastening unit 24, the first communications interface 25, a first storage device 26, a controller 27, an indicator 211, and an operating member 231. In the first embodiment, a battery pack 201 (refer to FIG. 3A) is supposed to be counted among the constituent elements of the tool 2. However, the battery pack 201 does not have to be one of the constituent elements of the tool 2. In other words, the battery pack 201 may be counted out of the constituent elements of the tool 2. For example, the battery pack 201 may be separate from the tool 2 (tool body) and may be attached removably to the tool 2 (tool body).

Figures 3A, 3B:
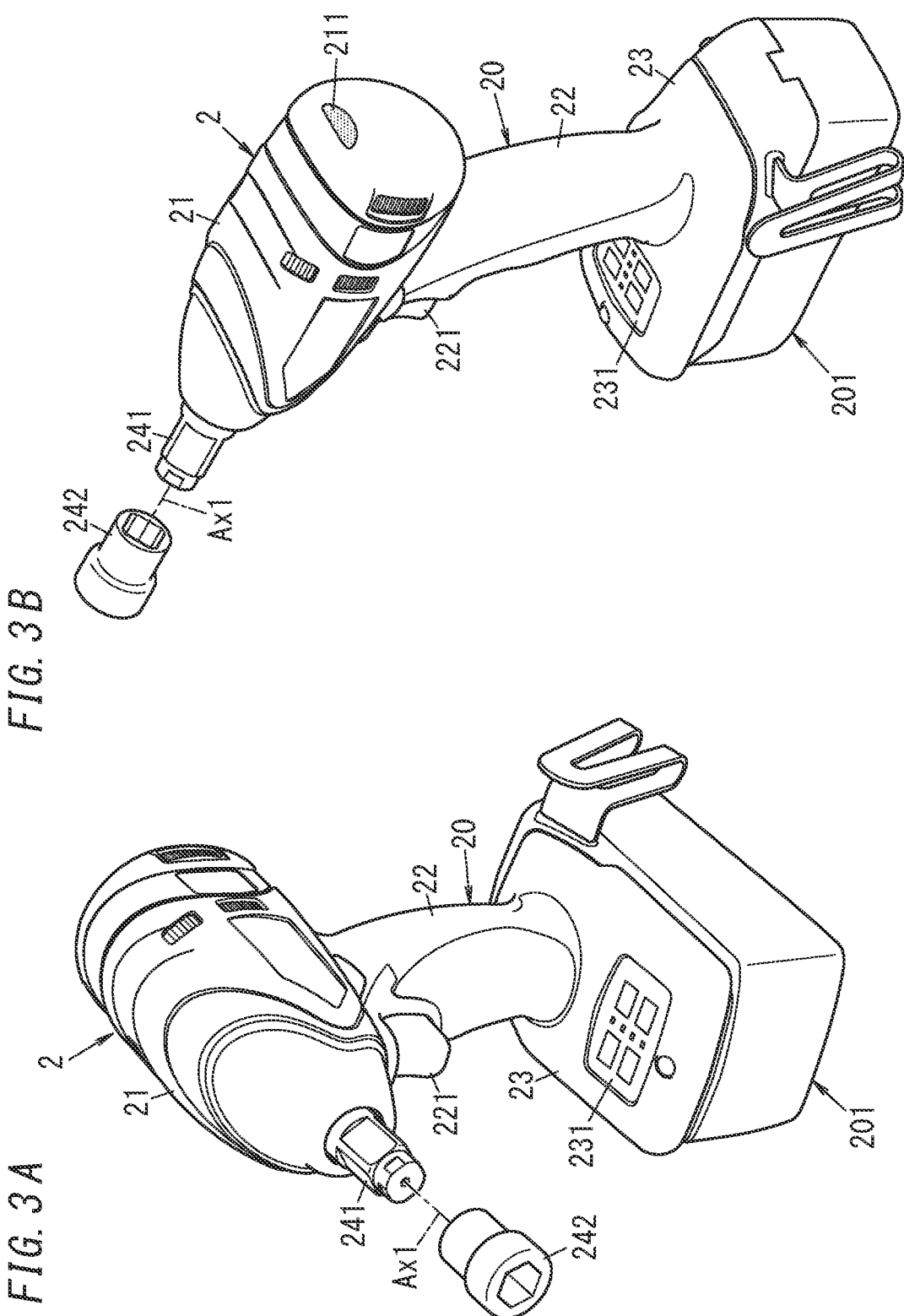
FIG. 3A is a perspective view illustrating the appearance, as viewed from the front, of a tool included in the tool system.
FIG. 3B is a perspective view illustrating the appearance, as viewed from the rear, of the tool.

As shown in FIGS. 3A and 3B, the tool 2 further includes a body 20. The body 20 of the tool 2 includes a barrel 21, a grip 22, and an attachment member 23.

The barrel 21 is formed in a cylindrical shape (e.g., circular cylindrical shape in this embodiment). The grip 22 protrudes in one direction (e.g., downward in FIG. 3A) from a part of the circumferential surface of the barrel 21. The attachment member 23 is provided at the tip (i.e., bottom) of the grip 22. To the attachment member 23, the battery pack 201 is attached removably. In other words, the barrel 21 and the attachment member 23 are coupled together via the grip 22.

At least part of the fastening unit 24 (refer to FIG. 2) is housed in the barrel 21. An output shaft 241 (to be described later) of the fastening unit 24 protrudes from one axial end surface of the barrel 21.

The grip 22 is a part to be gripped by the user while he or she is performing the work. The grip 22 is provided with a trigger switch 221. The trigger switch 221 is a switch for controlling the ON/OFF states of the operation performed by the fastening unit 24. The trigger switch 221 has an initial position and an ON position. The fastening unit 24 is activated when the trigger switch 221 is pushed or pulled to the ON position by the user. In addition, the trigger switch 221 also allows the number of revolutions of the fastening unit 24 to be adjusted according to how deep the trigger switch 221 is pulled (i.e., according to the manipulative variable of the trigger switch 221).

The attachment member 23 is formed in the shape of a compressed rectangular parallelepiped. The battery pack 201 is attached removably to one side, opposite from the grip 22, of the attachment member 23.

The battery pack 201 may be, for example, a lithium-ion battery. The battery pack 201 supplies electric power to the fastening unit 24, the first communications interface 25, the first storage device 26, the controller 27, and other constituent members.

The attachment member 23 is also provided with the operating member 231. The operating member 231 allows the user to enter various types of settings for, and confirm the state of, the tool 2. That is to say, by operating the operating member 231, the user is allowed to check the remaining capacity of the battery pack 201, for example.

The indicator 211 may be implemented as, for example, light-emitting diodes (LEDs). The indicator 211 is provided at the other end portion (i.e., at the rear end portion), opposite from one end portion from which the output shaft 241 protrudes (i.e., the frontend portion), of the barrel 21 of the body 20 to allow the user to view the indicator 211 easily during the work (refer to FIG. 3B).

The fastening unit 24 according to the first embodiment includes a motor, a speed reducer mechanism, a drive shaft, an impact mechanism, the output shaft 241, and the socket 242. The fastening unit 24 is configured to be activated with the power supplied from the battery pack 201 to the motor. The fastening unit 24 fastens the fastening member by driving the tip tool (socket 242) in rotation with the motive power supplied from the motor.

The speed reducer mechanism transmits the rotational force of the rotary shaft of the motor to the drive shaft. The speed reducer mechanism may be, for example, a planetary gear mechanism and transforms the rotational velocity and torque of the rotary shaft of the motor into a rotational velocity and torque required for the fastening operation. The output shaft 241 transmits the rotational force (or the torque) of the drive shaft to the socket 242. The output shaft 241 turns around a rotational axis Ax1, which is aligned with the direction in which the output shaft 241 protrudes. That is to say, the fastening unit 24 drives the output shaft 241 in rotation around the rotational axis Ax1. In other words, as the fastening unit 24 is activated, the torque is applied to the output shaft 241, thereby causing the output shaft 241 to turn.

A cylindrical socket 242 for rotating a fastening member (such as a bolt or a nut) is attached removably onto the output shaft 241. The socket 242 turns along with, and around, the output shaft 241. The size of the socket 242 attached to the output shaft 241 may be selected as appropriate by the user according to the size of the fastening member. According to such a configuration, activating the fastening unit 24 causes the output shaft 241 to turn, thus causing the socket 242 to rotate along with the output shaft 241. If a fastening member is fitted into the socket 242 at this time, then the fastening member turns along with the socket 242, thus having the work of fastening the fastening member (i.e., the fastening operation) done. In this manner, the tool 2 may have the work of fastening the fastening member done by activating the fastening unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The impact mechanism is driven with the motive power of the motor. The impact mechanism may include, for example, a hammer supported rotatably by the drive shaft and an anvil (impacting member) provided at the rear end portion of the output shaft 241. The hammer strikes the anvil as the drive shaft turns.

The impact mechanism is configured to, when (the work value of) fastening torque exceeds a predetermined level, apply impacting force in the rotational direction to the output shaft 241. This allows the tool 2 to apply greater fastening torque to the fastening member. Note that the socket 242 and the impact mechanism do not have to be constituent elements of the fastening unit 24. In other words, the socket 242 and the impact mechanism may be counted out of the constituent elements of the fastening unit 24.

The first communications interface 25 includes a communications interface for wirelessly communicating with the (external device 4 of the) external system 3. The first communications interface 25 communicates with the external system 3 by a wireless communications protocol compliant with a standard such as Wi-Fi®, Bluetooth®, ZigBee®, or a low power radio standard requiring no licenses (such as the Specified Low Power Radio standard).

The first communications interface 25 receives a fastening instruction from the external device 4. In addition, under the control of the controller 27, the first communications interface 25 transmits the result information to the external device 4 of the external system 3 with the progress of the work. More specifically, every time the fastening unit 24 performs the fastening operation, the first communications interface 25 transmits, to the external device 4, result information about the fastening operation that has been performed.

The first communications interface 25 according to the first embodiment transmits, when the wireless communication with the (external device 4 of the) external system 3 has recovered from a communications breakdown, a reconnection notification and the progress information to the external system 3. As used herein, the "reconnection notification" is a piece of information notifying, when the wireless communication between the first communications interface 25 and the external system 3 has recovered from a communication breakdown, the external system 3 of the reconnection (i.e., recovery).

In addition, the first communications interface 25 according to the first embodiment also transmits the part of the result information, which has been determined to be missing by the determiner 461, to the external device 4 of the external system 3. More specifically, the first communications interface 25 transmits, in response to a request for result information transmitted from the external system 3, a part of the result information, corresponding to the request for result information, to the external system 3. Having the first communications interface 25 transmit a part of the result information, which has not been received yet by the second communications interface 41 of the external system 3, to the external system 3 allows the result information about the work performed by the (fastening unit 24 of the) tool 2 to be stored in the external system 3.

The first storage device 26 includes a semiconductor memory such as a read-only memory (ROM) or a random-access memory (RAM), each of which is electrically programmable. Note that the first storage device 26 does not have to be a semiconductor memory but may also be, for example, a hard disk drive.

The first storage device 26 stores the result information about the fastening operation performed by the fastening unit 24.

The controller 27 includes, as a major constituent element thereof, a computer system including one or more processors and one or more memories. The tool 2 performs the functions of the controller 27 by making the one or more processors execute a program stored in the memory. The program may be stored in advance in the memory. Alternatively, the program may also be downloaded via a telecommunications line such as the Internet or distributed after having been stored in a non-transitory storage medium such as a memory card.

The controller 27 controls the fastening unit 24, the first communications interface 25, the first storage device 26, and the indicator 211 on an individual basis by outputting control signals to the fastening unit 24, the first communications interface 25, the first storage device 26, and the indicator 211, respectively.

The controller 27 controls the fastening unit 24 such that the fastening torque produced by the fastening operation becomes equal to a target torque value defined by the fastening instruction received by the first communications interface 25. In this case, the controller 27 has a torque estimating function of estimating the magnitude of the fastening torque. In the first embodiment, the controller 27 estimates, until the estimated value of the fastening torque reaches a seating determination level, the magnitude of the fastening torque based on the number of revolutions or any other parameter of the fastening unit 24 (motor). When the estimated value of the fastening torque reaches the seating determination level, the controller 27 estimates the magnitude of the fastening torque based on the number of strokes by the impact mechanism. When determining the number of stokes by the impact mechanism has reached a threshold number of times based on the target torque value, the controller 27 decides that the fastening torque have reached the target torque value, and stops running the fastening unit 24 (i.e., the motor). This allows the tool 2 to fasten the fastening member with fastening torque that exactly matches the target torque value.

The controller 27 according to the first embodiment makes the first storage device 26 store, every time the fastening unit 24 has performed the fastening operation, the result information about the fastening operation thus performed. In addition, the controller 27 performs control such that every time the fastening unit 24 has performed the fastening operation, the first communications interface 25 transmits the result information to the external system 3.

Furthermore, the controller 27 also performs control such that when the wireless communication between the first communications interface 25 and the (external device 4 of the) external system 3 has recovered from a communication breakdown, the first communications interface 25 transmits the reconnection notification and the progress information to the external system 3.

Furthermore, if the first communications interface 25 has received any request for result information from the external system 3, then the controller 27 performs control such that the first communications interface 25 transmits result information, specified by the request for result information, to the external system 3. As used herein, the "request for result information" is a request sent from the external system 3 to the tool 2 to make the tool 2 transmit the specified piece of result information.

(2.3) Configuration for External System

As shown in FIG. 1, the external system 3 according to the first embodiment includes the external device 4 and the high-order device 5.

(2.4) Configuration for High-Order Device

The high-order device 5 may be implemented as, for example, a programmable logic controller (PLC), a personal computer (PC), or a server. The high-order device 5 has the capability of communicating with the external device 4. In the first embodiment, the communication between the high-order device 5 and the external device 4 may be compliant with a communications protocol for a wired local area network (LAN) such as the Ethernet® standard. Note that the high-order device 5 and the external device 4 may also be configured to wirelessly communicate with each other.

The high-order device 5 transmits the fastening instruction to the external device 4 either in accordance with an operating command given by an administrator of the assembly line or as per settings entered in advance. In addition, the high-order device 5 also has the capability of collectively managing the data transmitted from the external device 4. Specifically, the high-order device 5 manages the history of the fastening operation that has been performed so far by the tool 2 by storing, every time the fastening operation is performed, the result information transmitted from the external device 4.

(2.5) Configuration for External Device

As shown in FIG. 2, the external device 4 according to the first embodiment includes the second communications interface 41 (communications interface), a third communications interface 42, an indicator 43, an operating member 44, the second storage device 45 (storage device), and a controller 46.

The second communications interface 41 includes a communications interface for wirelessly communicating with the (first communications interface 25 of the) tool 2. The second communications interface 41 communicates with the tool 2 by a wireless communications protocol as described above.

The second communications interface 41 transmits, to the tool 2, the fastening instruction that the third communications interface 42 has received from the high-order device 5. In addition, the second communications interface 41 also receives the result information from the tool 2.

The second communications interface 41 according to the first embodiment further receives, when the wireless communication with the (first communications interface 25 of the) tool 2 has recovered from a communications breakdown, the progress information from the tool 2.

The third communications interface 42 includes a communications interface for establishing wired communication with the high-order device 5. The third communications interface 42 receives the fastening instruction from the high-order device 5 as described above.

In addition, the third communications interface 42 also transmits, to the high-order device 5, the result information and other pieces of information received by the second communications interface 41. Note that the third communications interface 42 may transmit data to the high-order device 5 at an arbitrary timing. For example, the third communications interface 42 may transmit the data to the high-order device 5 at regular intervals. Alternatively, the third communications interface 42 may transmit all data collectively to the high-order device 5 at a point in time when all work has been finished. Still alternatively, the third communications interface 42 may transmit the data to the high-order device 5 at a point in time when the third communications interface 42 is requested to transmit the data by the high-order device 5.

The indicator 43 may be implemented as LEDs, for example. The operating member 44 may be made up of, for example, a plurality of push button switches. Note that if the external device 4 includes a touchscreen panel display, then the touch panel display may serve as both the indicator 43 and the operating member 44.

The second storage device 45 may include, for example, a semiconductor memory such as a ROM or a RAM, each of which is electrically programmable. However, the second storage device 45 does not have to include a semiconductor method but may include a hard disk drive, for example.

The second storage device 45 stores the fastening instruction that the third communications interface 42 has received from the high-order device 5 and the result information that the second communications interface 41 has received from the tool 2. In addition, the second storage device 45 also stores tool registration information, such as the model number and identification information of the tool 2, which is managed by the external device 4 (of the external system 3). Furthermore, the second storage device 45 further stores tool setting information including the fastening parameter settings of the fastening operation to be performed by the tool 2.

The controller 46 includes, as a major constituent element thereof, a computer system including one or more processors and one or more memories. The external device 4 performs the functions of the controller 46 by making the one or more processors execute a program stored in the memory. The program may be stored in advance in the memory. Alternatively, the program may also be downloaded via a telecommunications line such as the Internet or distributed after having been stored in a non-transitory storage medium such as a memory card.

The controller 46 controls the second communications interface 41, the third communications interface 42, the indicator 43, and the second storage device 45 on an individual basis by outputting control signals to the second communications interface 41, the third communications interface 42, the indicator 43, and the second storage device 45, respectively.

The controller 46 according to the first embodiment includes the determiner 461, a requester 462, a communications detector 463, and a decider 464.

The communications detector 463 detects any change in the status of wireless communication between the (first communications interface 25 of the) tool 2 and the second communications interface 41. More specifically, if the second communications interface 41 receives a reconnection notification from the tool 2, the communications detector 463 detects a recovery from the communication breakdown.

The determiner 461 determines, based on the progress information transmitted from the first communications interface 25 of the tool 2 to the second communications interface 41 and the result information stored in the second storage device 45, what part of the result information has not been received yet by the second communications interface 41.

For example, if the progress information indicates a work order number "3," then the determiner 461 determines whether a piece of result information associated with the work order number "1," a piece of result information associated with the work order number "2," and a piece of result information associated with the work order number "3" are all stored in the second storage device 45. If the three pieces of result information associated with the work order numbers "1," "2," and "3," respectively, are all stored in the second storage device 45, then the determiner 461 decides that the result information include no missing parts that the second communications interface 41 has failed to receive. In other words, if all pieces of result information, associated with the work order numbers equal to or less than the one indicated by the progress information, are stored in the second storage device 45, the determiner 461 decides that the result information include no missing parts that the second communications interface 41 has failed to receive. Stated otherwise, if all pieces of result information, associated with the work order numbers equal to or less than the one indicated by the progress information, are stored in the second storage device 45, the determiner 461 does not determine whether there is any missing part of the result information that the second communications interface 41 has failed to receive.

On the other hand, if only a piece of result information associated with the work order number "1" is stored in the second storage device 45, for example, then the determiner 461 determines a piece of result information associated with the work order number "2" and a piece of result information associated with the work order number "3" to be the missing parts of the result information that the second communications interface 41 has failed to receive. In other words, unless at least one piece of result information, associated with the work order number equal to or less than the one indicated by the progress information, is stored in the second storage device 45, the determiner 461 determines the part of the result information associated with the missing work order number to be a missing part of the result information that has not been received by the second communications interface 41 yet.

In the tool system 1 according to the first embodiment, the (external device 4 of the) external system 3 includes the determiner 461, and therefore, the tool 2 does not have to include the determiner 461, thus allowing the tool 2 to have a wider variety of functions and thereby reducing an increase in the size of the tool 2.

The determiner 461 according to the first embodiment determines, if the communications detector 463 detects a recovery from the communication breakdown, what part of the result information the second communications interface 41 has failed to receive.

The tool system 1 according to the first embodiment allows the external system 3 to request the tool 2, for example, to transmit the missing part of the result information that the second communications interface 41 has failed to receive due to a communication breakdown. Thus, the external system 3 allows the second storage device 45 to store the result information that is constantly updated into almost the latest information.

The requester 462 requests the tool 2 to transmit that part of the result information determined to be missing by the determiner 461. More specifically, the requester 462 controls the second communications interface 41 to make the second communications interface 41 transmit a request for result information to the tool 2.

In the tool system 1 according to the first embodiment, the external system 3 determines what part of the result information the second communications interface 41 has failed to receive and requests the tool 2 to transmit that missing part of the result information. This allows the result information about the work performed by the tool 2 to be stored in the second storage device 45 with more reliability.

The decider 464 decides, based on the result information stored in the second storage device 45 and information about a series of predetermined work process steps, whether the series of work process step has been finished yet. In the first embodiment, the information about the series of predetermined work process steps is the fastening instruction that the third communications interface 42 receives from the high-order device 5.

For example, if the fastening instruction is information instructing that three sessions of fastening operation be performed, then the decider 464 determines whether a piece of result information associated with the work order number "1," another piece of result information associated with the work order number "2," and still another piece of result information associated with the work order number "3" are stored in the second storage device 45. When finding that these three pieces of result information associated the work order numbers "1," "2," and "3" are all stored in the second storage device 45, the decider 464 decides that the series of predetermined work process step have been finished. In other words, if pieces of result information about all of the multiple sessions of fastening operation as instructed by the fastening instruction are stored in the second storage device 45, the decider 464 decides that the series of predetermined work process steps have been finished. Note that the result information stored in the second storage device 45 includes the result information that has been transmitted from the tool 2 in response to the request sent from the requester 462 to the tool 2.

On the other hand, if only a piece of result information associated with the work order number "1," for example, is stored in the second storage device 45, then the decider 464 decides that the series of predetermined work process steps have not been finished yet. In other words, unless pieces of result information about all of the multiple sessions of fastening operation as instructed by the fastening instruction are stored in the second storage device 45, the decider 464 decides that the series of predetermined work process steps have not been finished yet.

In the tool system 1 according to the first embodiment, the external system 3 may determine, based on the result information stored in the second storage device 45, whether the series of work process steps have been finished yet or not. Thus, when deciding that the series of work process steps have been finished, the external system 3 may, for example, transmit the next fastening instruction to the tool 2.

(3) Operation of Tool System

Next, it will be described with reference to FIG. 4 how the tool system 1 according to the first embodiment operates.

First, the tool 2 and the external device 4 (of the external system 3) are connected wirelessly (in S1). Then, the external device 4 transmits a fastening instruction to the tool 2 (in S2). In the following description, a situation where the fastening instruction transmitted from the external device 4 to the tool 2 indicates that three sessions of fastening operation be performed will be described as an example. Note that although not shown in FIG. 4, on receiving the fastening instruction from the high-order device 5, for example, the external device 4 forwards the fastening instruction to the tool 2.

On receiving the fastening instruction, the fastening unit 24 of the tool 2 performs a fastening operation for the first time (i.e., the first session of the fastening operation) with a target torque value as instructed by the fastening instruction (in S3). Then, the first communications interface 25 of the tool 2 transmits a piece of result information associated with the work order number "1" to the external device 4 (in S4). The external device 4 receives the piece of result information associated with the work order number "1" and makes the second storage device 45 store the piece of result information.

In the following description, a situation where after the external device 4 has received the piece of result information associated with the work order number "1," the wireless communication between the tool 2 and the external device 4 has broken down (i.e., a communication breakdown has occurred between the tool 2 and the external device 4) will be described as an example.

The fastening unit 24 of the tool 2 performs a fastening operation for the second time (i.e., the second session of the fastening operation) with the target torque value as instructed by the fastening instruction (in S5). Then, the first communications interface 25 of the tool 2 tries to transmit a piece of result information associated with the work order number "2" to the external device 4 (in S6). Nevertheless, the second communications interface 41 of the external device 4 cannot receive the piece of result information associated with the work order number "2" due to the communication breakdown between the tool 2 and the external device 4.

In the same way, the fastening unit 24 of the tool 2 performs a fastening operation for the third time (i.e., the third session of the fastening operation) with the target torque value as instructed by the fastening instruction (in S7). Then, the first communications interface 25 of the tool 2 tries to transmit a piece of result information associated with the work order number "3" to the external device 4 (in S8). Nevertheless, the second communications interface 41 of the external device 4 cannot receive the piece of result information associated with the work order number "3" due to the communication breakdown between the tool 2 and the external device 4.

Suppose the wireless communication between the tool 2 and the external device 4 has been reestablished (in S9). If the wireless communication between the tool 2 and the external device 4 has recovered from the communication breakdown, the tool 2 transmits a reconnection notification and progress information (i.e., the work order number "3") to the external device 4 (in S10). In the example shown in FIG. 4, the tool 2 transmits the reconnection information and the progress information simultaneously. However, this is only an example and should not be construed as limiting. Alternatively, the reconnection notification and the progress information may be transmitted separately from each other.

The communications detector 463 of the external device 4 detects, based on the reconnection notification received, a recovery from the communication breakdown (in S11). Alternatively, the communications detector 463 may detect the recovery from the communication breakdown based on the progress information received.

When the communications detector 463 detects the recovery from the communication breakdown, the determiner 461 of the external device 4 determines, based on the progress information received, what part of the result information the second communications interface 41 has failed to receive (i.e., performs determination processing) (in S12). In the example shown in FIG. 4, the determiner 461 determines a piece of result information associated with the work order number "2" and another piece of result information associated with the work order number "3" to be missing parts.

The requester 462 of the external device 4 requests the tool 2 to transmit these pieces of result information associated with the work order numbers "2" and "3," respectively, which have been determined to be missing by the determiner 461 (in S13). In response to the request for result information received, the tool 2 transmits these pieces of result information associated with the work order numbers "2" and "3" to the external device 4 (in S14).

Figure 4:
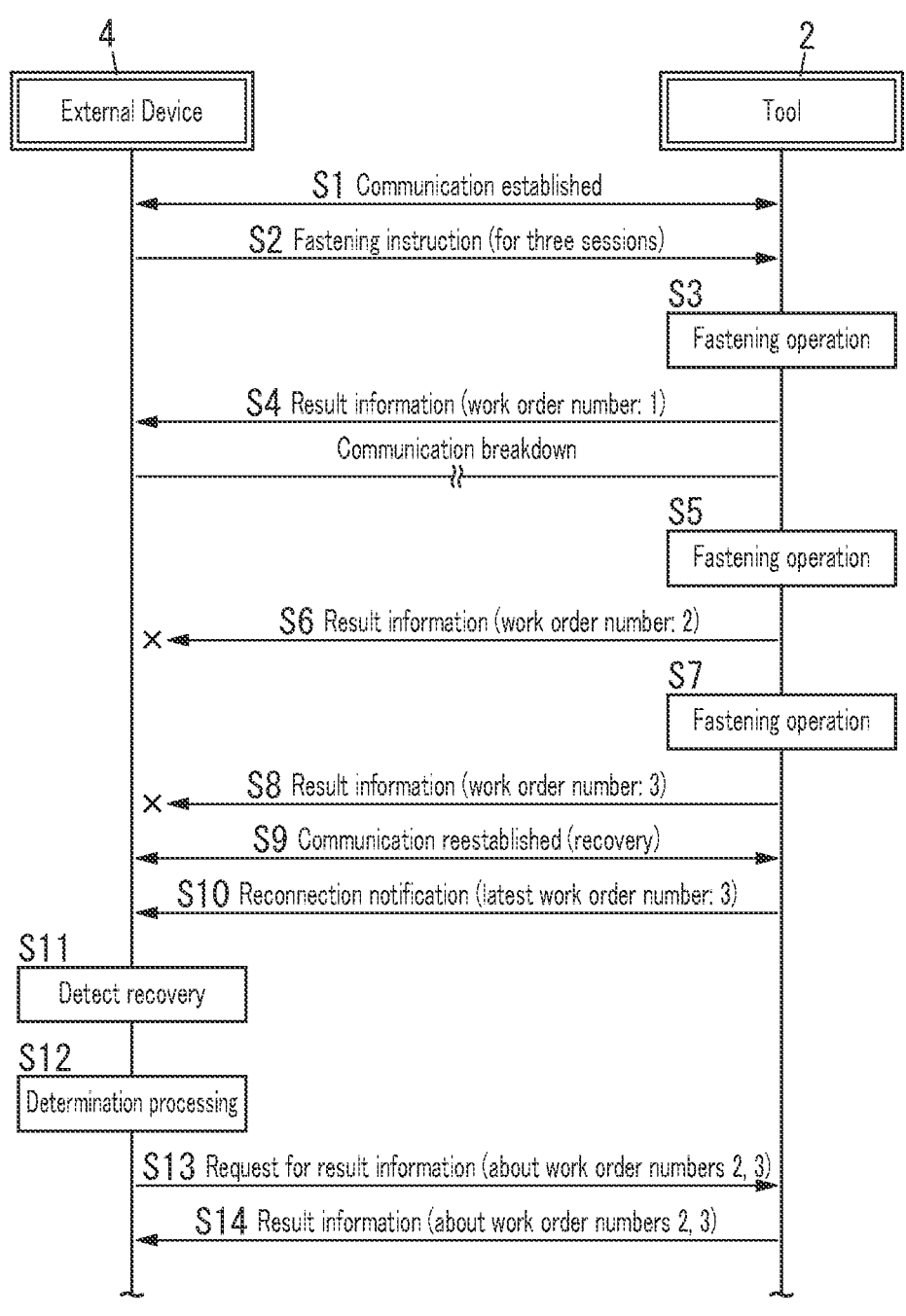
FIG. 4 shows the sequence of operations to be performed by the tool system.

Although not shown in FIG. 4, the pieces of result information associated with the work order numbers "2" and "3" are received by the second communications interface 41 of the external device 4 and stored in the second storage device 45. Then, the decider 464 decides that the series of work process steps have been finished. Next, the external device 4, for example, transmits the result information about the series of work process steps (i.e., the result information stored in the second storage device 45) to the high-order device 5.

Note that the sequence chart shown in FIG. 4 shows just an exemplary operation of the tool system 1. Thus, the processing steps shown in FIG. 4 may be performed in a different order as appropriate, an additional processing step may be performed as needed, or at least one of the processing steps may be omitted as appropriate.

(4) Variations

Next, variations of the first embodiment will be enumerated one after another. Note that the variations to be described below may be adopted in combination as appropriate.

The functions of the tool system 1 according to the first embodiment may also be implemented as a determination method, a (computer) program, or a non-transitory storage medium that stores the program thereon. A determination method according to an aspect is designed to be used in a tool system 1 including a tool 2 and an external system 3. The tool 2 transmits result information, including a work order number, to an external system 3 with progress of work. The external system 3 receives the result information from the tool 2 and makes a second storage device 45 store the result information received. The determination method includes a determination step including determining, based on progress information indicating the progress of the work being performed by the tool 2 and the result information stored in the second storage device 45, what part of the result information the external system 3 has failed to receive. A program according to another aspect is designed to cause one or more processors to perform the determination method described above.

The tool system 1 or the agent that performs the determination method according to the present disclosure includes a computer system. The computer system may include a processor and a memory as principal hardware components thereof. The functions of the tool system 1 or the agent that performs the determination method according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC and an LSI include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the tool system 1 are aggregated together in a single housing. However, this is not an essential configuration for the tool system 1. Alternatively, those constituent elements of the tool system 1 may be distributed in multiple different housings. Still alternatively, at least some functions of the tool system 1 (e.g., some functions of the external device 4) may be implemented as a cloud computing system as well.

Conversely, at least some functions of the tool system 1 which are distributed in multiple devices in the first embodiment may be aggregated together in a single housing. For example, some functions of the external system 3, which are distributed in the external device 4 and the high-order device 5, may be aggregated together in a single housing.

In the first embodiment described above, the external device 4 (of the external system 3) is supposed to include the determiner 461. However, this is only an example and should not be construed as limiting. Alternatively, the tool 2 may include the determiner 461 instead of the external device 4. If the tool 2 includes the determiner 461, then the external system 3 transmits, to the tool 2, information representing the result information stored in the second storage device 45. On receiving, from the external system 3, the information representing the result information stored in the second storage device 45, the tool 2 determines what part of the result information is not stored in (i.e., missing from) the second storage device 45 (i.e., what part of the result information the second communications interface 41 has failed to receive). Then, the tool 2 transmits, to the external system 3, that part of the result information determined to be missing.

In the first embodiment described above, the work order number is supposed to be an Arabic numeral. However, this is only an example and should not be construed as limiting. Alternatively, the work order number may also be a letter such as an alphabet, a hiragana, or a katakana. For example, if the work order number is an alphabet, then the first session of the fastening operation is associated with the letter "A," the second session of the fastening operation is associated with the letter "B," and the third session of the fastening operation is associated with the letter "C."

Optionally, the high-order device 5 may be omitted from the external system 3. If the external system 3 includes no high-order device 5, then the external device 4 transmits a fastening instruction to the tool 2 in accordance with a predetermined type of operation performed by, for example, an administrator on the operating member 44 of the external device 4.

In the first embodiment described above, a tool system 1 that allows the second communications interface 41 of the external system 3 to receive, with reliability, the result information from the tool 2 has been described as an example. Alternatively, the tool system 1 may also be configured to allow the second communications interface 41 of the external system 3 to receive, with more reliability, log information transmitted from the tool 2. As used herein, the "log information" may include, for example, information about the history of operations that have been performed on the tool 2 and information about the history of errors that have occurred to the tool 2. If the log information includes serial numbers such as log numbers, the log information transmitted from the tool 2 may be received, with more reliability, by the second communications interface 41 of the external system 3 as well as the result information described as an example for the first embodiment.

In the first embodiment described above, the tool 2 is an impact wrench. However, the tool 2 does not have to be an impact wrench but may also be an impact screwdriver, a drill-screwdriver, a nut runner, or an oil pulse wrench, for example. Furthermore, the tool 2 does not have to be powered by the battery pack 201 but may also be powered by an AC power supply (commercial power supply). Moreover, the tool 2 does not have to be an electric tool but may also be an air tool including an air motor to be operated by compressed air supplied from an air compressor.

Second Embodiment

In a tool system 1 according to a second embodiment, the determiner 461 determines, based on continuation information included in the result information transmitted from the tool 2, whether the series of predetermined work process steps have been finished, and if the answer is YES, the determiner 461 determines what part of the result information the second communications interface 41 has failed to receive, which is a difference from the tool system 1 according to the first embodiment.

Next, it will be described with reference to FIG. 5 how the tool system 1 according to the second embodiment operates. First, the tool 2 and the external device 4 (of the external system 3) are connected wirelessly (in S21). Then, the external device 4 transmits a fastening instruction to the tool 2 (in S22). In the following description, a situation where the fastening instruction transmitted from the external device 4 to the tool 2 indicates that three sessions of fastening operation be performed will be described as an example. Note that although not shown in FIG. 5, on receiving the fastening instruction from the high-order device 5, for example, the external device 4 forwards the fastening instruction to the tool 2.

On receiving the fastening instruction, the fastening unit 24 of the tool 2 performs a fastening operation for the first time (i.e., the first session of the fastening operation) with a target torque value as instructed by the fastening instruction (in S23). Then, the first communications interface 25 of the tool 2 transmits a piece of result information associated with the work order number "1" to the external device 4 (in S24). In this embodiment, the result information transmitted by the tool 2 includes continuation information. As used herein, the "continuation information" is a piece of information indicating whether the series of work process steps should be further continued. The series of work process steps defined by the fastening instruction is the work of fastening three fastening members. Thus, the piece of result information associated with the work order number "1" includes continuation information indicating that the work is to be continued. The external device 4 receives the piece of result information associated with the work order number "1" and makes the second storage device 45 store the piece of result information.

The determiner 461 of the external device 4 performs decision processing of deciding, based on the continuation information included in the piece of result information associated with the work order number "1" that the second communications interface 41 has received, whether the series of work process steps have been finished (in S25). The continuation information included in the piece of result information associated with the work order number "1" indicates that the work is to be continued, and therefore, the determiner 461 decides that the series of work process steps have not been finished yet.

The fastening unit 24 of the tool 2 performs a fastening operation for the second time (i.e., the second session of the fastening operation) with the target torque value as instructed by the fastening instruction (in S26). Then, the first communications interface 25 of the tool 2 transmits a piece of result information associated with the work order number "2" to the external device 4 (in S27). The piece of result information associated with the work order number "2" includes continuation information indicating that the work is to be continued. In the example shown in FIG. 5, the second communications interface 41 of the external device 4 is supposed to have failed to receive the piece of result information associated with the work order number "2" due to a communication breakdown that has occurred during the wireless communication, for example.

The fastening unit 24 of the tool 2 further performs a fastening operation for the third time (i.e., the third session of the fastening operation) with the target torque value as instructed by the fastening instruction (in S28). Then, the first communications interface 25 of the tool 2 transmits a piece of result information associated with the work order number "3" to the external device 4 (in S29). The piece of result information associated with the work order number "3" includes continuation information indicating that the work is not to be continued, i.e., indicating that the series of work process steps have been finished.

The determiner 461 of the external device 4 performs the decision processing of deciding, based on the continuation information included in the piece of result information associated with the work order number "3" that the second communications interface 41 has received, whether the series of work process steps have been finished (in S30). The continuation information included in the piece of result information associated with the work order number "3" indicates that the work is not to be continued any longer, and therefore, the determiner 461 decides that the series of work process steps have been finished.

When deciding that the series of work process steps have been finished, the determiner 461 according to the second embodiment performs the determination processing of determining what part of the result information the second communications interface 41 has failed to receive (in S31). The piece of result information associated with the work order number "3" includes continuation information indicating that the series of work process steps have been finished. Thus, the determiner 461 determines whether all pieces of result information, associated with the work order numbers equal to or less than "3," are stored in the second storage device 45. In the example shown in FIG. 5, the determiner 461 determines the piece of result information associated with the work order number "2" to be the missing part of result information that the second communications interface 41 has failed to receive.

The requester 462 of the external device 4 requests the tool 2 to transmit the piece of result information associated with the work order number "2" determined to be missing by the determiner 461 (in S32). In response to the request for result information received, the tool 2 transmits the missing part of result information associated with the work order number "2" to the external device 4 (in S33).

Figure 5:
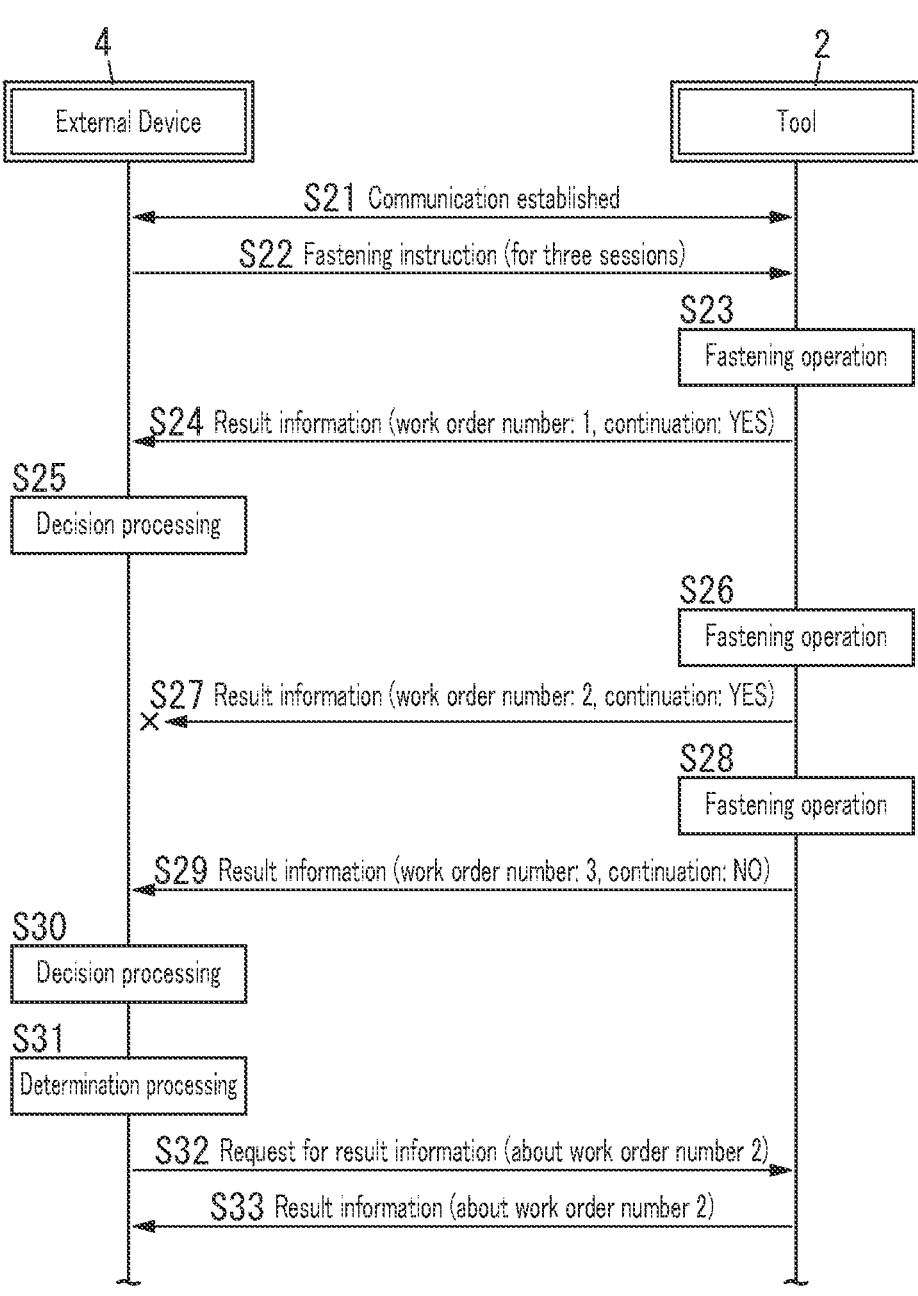
FIG. 5 shows the sequence of operations to be performed by a tool system according to a second embodiment.

Although not shown in FIG. 5, the missing part of result information associated with the work order number "2" is received by the second communications interface 41 of the external device 4 and stored in the second storage device 45. Then, the decider 464 decides that the series of work process steps have been finished. Next, the external device 4, for example, transmits the result information about the series of work process steps (i.e., the result information stored in the second storage device 45) to the high-order device 5.

In the tool system 1 according to the second embodiment, the external system 3 determines, at the timing when the series of predetermined work process steps have been finished, what part of the result information the second communications interface 41 has failed to receive. This allows the external system 3 to determine what part of the result information the second communications interface 41 has failed to receive, out of the result information about the series of work process steps, without missing any part of the result information. Thus, the external system 3 may make the second storage device 45 store the result information that is constantly updated into almost the latest information.

Note that the sequence chart shown in FIG. 5 shows just an exemplary operation of the tool system 1. Thus, the processing steps shown in FIG. 5 may be performed in a different order as appropriate, an additional processing step may be performed as needed, or at least one of the processing steps may be omitted as appropriate.

Note that the second embodiment described above is only an exemplary one of various embodiments of the present disclosure and should not be construed as limiting. Rather, the second embodiment may be readily modified in various manners depending on a design choice or any other factor without departing from the scope of the present disclosure.

For example, the decider 464, instead of the determiner 461, may determine, based on the continuation information included in the result information transmitted from the tool 2, whether the series of predetermined work process steps have been finished. If the decider 464 decides that the series of work process steps have been finished, then the determiner 461 may perform the determination processing.

In the tool system 1 according to the second embodiment, the determiner 461 is configured to determine, based on the continuation information, whether the series of work process steps is to be continued or not (i.e., have been finished yet). However, this configuration is only an example and should not be construed as limiting. Alternatively, the tool 2 may add the continuation information indicating that the series of work process steps have been finished (hereinafter referred to as "completion information") to only a piece of result information about the last session of the fastening operation in the series of work process steps. In that case, when finding that the result information includes no completion information, the determiner 461 of the external system 3 decides that the series of work process steps have not been finished yet. On the other hand, when finding that the result information includes the completion information, the determiner 461 decides that the series of work process steps have been finished.

The functions of the tool system 1 according to the second embodiment may also be implemented as a determination method, a (computer) program, or a non-transitory storage medium that stores the program thereon.

The various configurations described for the second embodiment may be adopted as appropriate in combination with the various configurations described above for the first embodiment (including its variations).

Third Embodiment

In a tool system 1 according to a third embodiment, the determiner 461 determines, in response to a work stop signal transmitted from the second communications interface 41, what part of the result information the second communications interface 41 has failed to receive, which is a difference from the tool system 1 according to any of the first and seconds embodiments described above.

Next, it will be described with reference to FIG. 6 how the tool system 1 according to the third embodiment operates. First, the tool 2 and the external device 4 (of the external system 3) are connected wirelessly (in S41). Then, the external device 4 transmits a fastening instruction to the tool 2 (in S2). In the following description, a situation where the fastening instruction transmitted from the external device 4 to the tool 2 indicates that three sessions of fastening operation be performed will be described as an example. Note that although not shown in FIG. 6, on receiving the fastening instruction from the high-order device 5, for example, the external device 4 forwards the fastening instruction to the tool 2.

On receiving the fastening instruction, the fastening unit 24 of the tool 2 performs a fastening operation for the first time (i.e., the first session of the fastening operation) with a target torque value as instructed by the fastening instruction (in S43). Then, the first communications interface 25 of the tool 2 transmits a piece of result information associated with the work order number "1" to the external device 4 (in S44). The external device 4 receives the piece of result information associated with the work order number "1" and makes the second storage device 45 store the piece of result information.

The fastening unit 24 of the tool 2 performs a fastening operation for the second time (i.e., the second session of the fastening operation) with the target torque value as instructed by the fastening instruction (in S45). Then, the first communications interface 25 of the tool 2 transmits a piece of result information associated with the work order number "2" to the external device 4 (in S46). In the example shown in FIG. 6, the second communications interface 41 of the external device 4 is supposed to have failed to receive the piece of result information associated with the work order number "2" due to a communication breakdown that has occurred during the wireless communication, for example.

In this embodiment, the external device 4 accepts a work stop instruction in response to a predetermined operation performed by the user on the operating member 44 of the external device 4, for example (in S47). Alternatively, the external device 4 may accept the work stop instruction received from the high-order device 5.

When the external device 4 accepts the work stop instruction, the second communications interface 41 transmits a work stop signal to the tool 2 (in S48). The work stop signal is a signal instructing the tool 2 to stop performing the series of work process steps. On receiving the work stop signal, the tool 2 transmits a work stop response to the external device 4 (in S49). In this embodiment, the work stop response transmitted by the tool 2 includes the progress information.

The determiner 461 according to the third embodiment performs the determination processing of determining, based on the progress information provided by the tool 2 and the result information stored in the second storage device 45, what part of the result information the second communications interface 41 has failed to receive (in S50). In the example shown in FIG. 6, the determiner 461 determines the piece of result information associated with the work order number "2" to be the missing part of the result information that the second communications interface 41 has failed to receive.

The requester 462 of the external device 4 requests the tool 2 to transmit the piece of result information associated with the work order number "2" determined to be missing by the determiner 461 (in S51). In response to the request for result information received, the tool 2 transmits the missing part of result information associated with the work order number "2" to the external device 4 (in S52).

In the tool system 1 according to the third embodiment, the determiner 461 determines, at the timing when the tool 2 stops performing the work, what part of the result information the second communications interface 41 has failed to receive. This allows the determiner 461 to determine what part of the result information the second communications interface 41 has failed to receive, out of the result information about the work that has been performed until the tool 2 stopped performing the work, without missing any part of the result information. Thus, the external system 3 may make the second storage device 45 store the result information that is constantly updated into almost the latest information.

Figure 6:
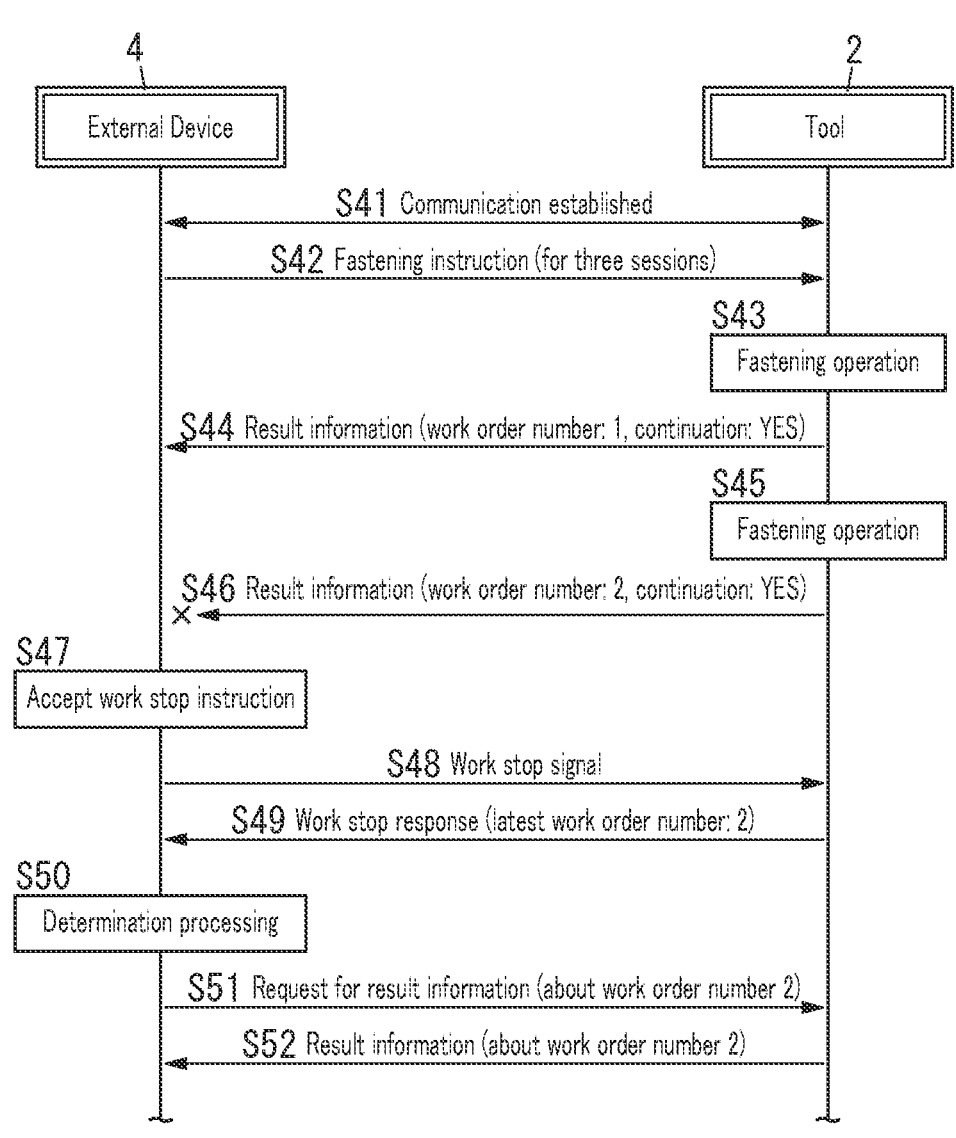
FIG. 6 shows the sequence of operations to be performed by a tool system according to a third embodiment.

Although not shown in FIG. 6, the external device 4 accepts a work resume instruction in response to a predetermined operation performed by the user on the operating member 44 of the external device 4, for example. When the external device 4 accepts the work resume instruction, the second communications interface 41 transmits a work resume signal to the tool 2. On receiving the work resume signal, the tool 2 resumes performing the series of work process steps from the session of fastening operation next to the latest work order number at the point in time when the work was stopped (e.g., from the third session of the fastening operation in the example shown in FIG. 6).

Note that the sequence chart shown in FIG. 6 shows just an exemplary operation of the tool system 1. Thus, the processing steps shown in FIG. 6 may be performed in a different order as appropriate, an additional processing step may be performed as needed, or at least one of the processing steps may be omitted as appropriate.

Note that the third embodiment described above is only an exemplary one of various embodiments of the present disclosure and should not be construed as limiting. Rather, the third embodiment may be readily modified in various manners depending on a design choice or any other factor without departing from the scope of the present disclosure.

The tool 2 that has received the work stop signal may transmit the work stop response and the progress information separately to the external device 4.

The functions of the tool system 1 according to the third embodiment may also be implemented as a determination method, a (computer) program, or a non-transitory storage medium that stores the program thereon.

The various configurations described for the third embodiment may be adopted as appropriate in combination with the various configurations described above for the first and second embodiments (including their variations).

(Recapitulation)

As can be seen from the foregoing description, a tool system (1) according to a first aspect includes a tool (2) and an external system (3). The tool (2) includes a first communications interface (25). The first communications interface (25) transmits result information, including a work order number, to the external system (3) with progress of work. The external system (3) includes a second communications interface (41). The second communications interface (41) receives the result information from the tool (2). The external system (3) makes a storage device (second storage device 45) store the result information received by the second communications interface (41). At least one of the tool (2) or the external system (3) further includes a determiner (461). The determiner (461) determines, based on progress information indicating the progress of the work being performed by the tool (2) and the result information stored in the storage device, what part of the result information the second communications interface (41) has failed to receive.

This aspect enables determining what part of the result information is not stored in (i.e., is missing from) the storage device (second storage device 45) of the external system (3), i.e., what part of the result information the second communications interface (41) has failed to receive. Determining what part of the result information the second communications interface (41) has failed to receive allows the external system (3) to request the tool (2) to transmit that missing part of the result information that has not been received yet, thus reducing the chances of the result information having missing parts. In other words, this aspect reduces the chances of the external system (3) failing to receive parts of the result information, thus allowing the external system (3) to acquire the result information with more reliability even when wireless communication, which achieves a lower degree of stability than wired communication, is adopted.

In a tool system (1) according to a second aspect, which may be implemented in conjunction with the first aspect, the external system (3) includes the determiner (461). The determiner (461) determines, based on the progress information transmitted from the first communications interface (25) to the second communications interface (41) and the result information stored in the storage device (second storage device 45), what part of the result information the second communications interface (41) has failed to receive.

According to this aspect, the external system (3) includes the determiner (461), and therefore, the tool (2) does not have to include the determiner (461), thus allowing the tool (2) to have a wider variety of functions and thereby reducing an increase in the overall size of the tool (2).

In a tool system (1) according to a third aspect, which may be implemented in conjunction with the second aspect, the external system (3) further includes a requester (462). The requester (462) requests the tool (2) to transmit the part of the result information that the determiner (461) determines the second communications interface (41) has failed to receive.

According to this aspect, the external system (3) determines the part of the result information that the second communications interface (41) has failed to receive and requests the tool (2) to transmit that missing part of the result information. This allows the result information about the work performed by the tool (2) to be stored in the storage device (second storage device 45) with more reliability.

In a tool system (1) according to a fourth aspect, which may be implemented in conjunction with the second or third aspect, the external system (3) further includes a communications detector (463). The communications detector (463) detects any change in a status of wireless communication with the tool (2). The determiner (461) determines, when the communications detector (463) has detected a recovery from a communication breakdown, what part of the result information the second communications interface (41) has failed to receive.

This aspect allows the external system (3) to request the tool (2), for example, to transmit the missing part of the result information that the second communications interface (41) has failed to receive due to a communication breakdown. Thus, the external system (3) may make the storage device (second storage device 45) store result information that is constantly updated into almost the latest information.

In a tool system (1) according to a fifth aspect, which may be implemented in conjunction with any one of the second to fourth aspects, the determiner (461) determines whether a series of predetermined work process steps to be performed by the tool (2) has been finished. The determiner (461) determines, when deciding that the series of predetermined work process steps have been finished, what part of the result information the second communications interface (41) has failed to receive.

According to this aspect, the external system (3) determines, at the timing when the series of predetermined work process steps has been finished by the tool (2), what part of the result information has not been received by the second communications interface (41) yet. This enables determining, without fail, what part of the result information the second communications interface (41) has failed to receive, out of the result information about the series of work process steps. Thus, the external system (3) may make the storage device (second storage device 45) store result information that is constantly updated into almost the latest information.

In a tool system (1) according to a sixth aspect, which may be implemented in conjunction with any one of the second to fifth aspects, the second communications interface (41) transmits a work stop signal to the tool (2) as needed. The determiner (461) determines, when the second communications interface (41) has transmitted the work stop signal, what part of the result information the second communications interface (41) has failed to receive.

According to this aspect, the determiner (461) determines, at the timing when the tool (2) stops performing the work, what part of the result information the second communications interface (41) has failed to receive. This enables determining, without fail, what part of the result information the second communications interface (41) has failed to receive, out of the result information about the work that has been performed by the tool (2) up to the point in time when the work stopped being performed by the tool (2). Thus, the external system (3) may make the storage device (second storage device 45) store result information that is constantly updated into almost the latest information.

In a tool system (1) according to a seventh aspect, which may be implemented in conjunction with any one of the first to sixth aspects, the external system (3) further includes a decider (464) The decider (464) decides, based on the result information stored in the storage device (second storage device 45) and information about a series of predetermined work process steps, whether the series of predetermined work process steps has been finished.

This aspect allows the external system (3) to determine, based on the result information stored in the storage device (second storage device 45), whether the series of work process steps has been finished. Thus, when deciding that the series of work process steps have been finished, for example, the external system (3) may, for example, transmit the next work instruction to the tool (2).

In a tool system (1) according to an eighth aspect, which may be implemented in conjunction with any one of the first to seventh aspects, the first communications interface (25) transmits, to the external system (3), the part of the result information that the determiner (461) determines the second communications interface (41) has failed to receive.

According to this aspect, the tool (2) transmits, to the external system (3), that missing part of the result information that has not been received yet by the second communications interface (41) of the external system (3), thus allowing the external system (3) to store the result information about the work performed by the tool (2).

Note that the constituent elements according to the second to eighth aspects are not essential constituent elements for the tool system (1) but may be omitted as appropriate.

An external system (3) according to a ninth aspect includes a communications interface (second communications interface 41), a storage device (second storage device 45), and a determiner (461). The communications interface receives, from a tool (2), result information indicating a result of work performed by the tool (2) and including a work order number. The storage device stores the result information received by the communications interface. The determiner (461) determines, based on progress information indicating progress of the work being performed by the tool (2) and the result information stored in the storage device, what part of the result information the communications interface has failed to receive.

This aspect enables determining what part of the result information is not stored in (i.e., is missing from) the storage device (second storage device 45) of the external system (3), i.e., what part of the result information the second communications interface (41) has failed to receive. Determining what part of the result information the second communications interface (41) has failed to receive allows the external system (3) to request the tool (2) to transmit that missing part of the result information that has not been received yet, thus reducing the chances of the result information having missing parts. In other words, this aspect reduces the chances of the external system (3) failing to receive parts of the result information, thus allowing the external system (3) to acquire the result information with more reliability even when wireless communication, which achieves a lower degree of stability than wired communication, is adopted.

A determination method according to a tenth aspect is designed to be used in a tool system (1) including a tool (2)

and an external system (3). The tool (2) transmits result information, including a work order number, to an external system (3) with progress of work. The external system (3) receives the result information from the tool (2) and makes a storage device (second storage device 45) store the result information. The determination method includes a determination step including determining, based on progress information indicating the progress of the work being performed by the tool (2) and the result information stored in the storage device, what part of the result information the external system (3) has failed to receive.

This aspect enables determining what part of the result information is not stored in (i.e., is missing from) the storage device (second storage device 45) of the external system (3), i.e., what part of the result information the external system (3) has failed to receive. Determining what part of the result information the external system (3) has failed to receive allows the external system (3) to request the tool (2) to transmit that missing part of the result information that has not been received yet, thus reducing the chances of the result information having missing parts. In other words, this aspect reduces the chances of the external system (3) failing to receive parts of the result information, thus allowing the external system (3) to acquire the result information with more reliability even when wireless communication, which achieves a lower degree of stability than wired communication, is adopted.

A non-transitory storage medium according to an eleventh aspect stores thereon a program designed to cause one or more processors to perform the determination method according to the tenth aspect.

This aspect enables determining what part of the result information is not stored in (i.e., is missing from) the storage device (second storage device 45) of the external system (3), i.e., what part of the result information the external system (3) has failed to receive. Determining what part of the result information the external system (3) has failed to receive allows the external system (3) to request the tool (2) to transmit that missing part of the result information that has not been received yet, thus reducing the chances of the result information having missing parts. In other words, this aspect reduces the chances of the external system (3) failing to receive parts of the result information, thus allowing the external system (3) to acquire the result information with more reliability even when wireless communication, which achieves a lower degree of stability than wired communication, is adopted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A tool system comprising:
a tool being configured to perform a fastening operation and including a first communications interface; and
an external system including a second communications interface,
the first communications interface being configured to transmit result information, including a fastening torque of the fastening operation and including a work order number, to the external system with progress of the work, the second communications interface being configured to receive the result information from the tool,
the external system being configured to make a storage device store the result information received by the second communications interface,
at least one of the tool or the external system further including a processor,
the processor being configured to determine, based on progress information indicating the progress of the work being performed by the tool and the result information stored in the storage device, what part of the result information the second communications interface has failed to receive.

2. The tool system of claim 1, wherein
the external system includes the processor, and
the processor is configured to determine, based on the progress information transmitted from the first communications interface to the second communications interface and the result information stored in the storage device, what part of the result information the second communications interface has failed to receive.

3. The tool system of claim 2, wherein
the processor is configured to request the tool to transmit the part of the result information that the processor determines the second communications interface has failed to receive.

4. The tool system of claim 2, wherein
the processor is configured to detect any change in a status of wireless communication with the tool, and
the processor is configured to, when the communications detector has detected a recovery from a communication breakdown, determine what part of the result information the second communications interface has failed to receive.

5. The tool system of claim 2, wherein
the processor is configured to determine whether a series of predetermined work process steps to be performed by the tool has been finished, and determine, when deciding that the series of predetermined work process steps have been finished, what part of the result information the second communications interface has failed to receive.

6. The tool system of claim 2, wherein
the second communications interface is configured to transmit a work stop signal to the tool as needed, and
the processor is configured to, when the second communications interface has transmitted the work stop signal, determine what part of the result information the second communications interface has failed to receive.

7. The tool system of claim 1, wherein
the processor is configured to decide, based on the result information stored in the storage device and information about a series of predetermined work process steps, whether the series of predetermined work process steps has been finished.

8. The tool system of claim 1, wherein
the first communications interface is configured to transmit, to the external system, the part of the result information that the processor determines the second communications interface has failed to receive.

9. The tool system of claim 1, wherein
the result information includes a measured value of the fastening torque associated with the work order number, and
the processor is configured to determine that the second communications interface has failed to receive the measured value of the fastening torque associated with a specific work order number when the result information stored in the storage device lacks the measured value corresponding to the specific work order number despite the progress information indicating that the work associated with the specific work order number has been performed.

10. An external system comprising:
a communications interface configured to receive, from a tool configured to perform a fastening operation, result information including a fastening torque of the fastening operation and including a work order number,
a storage device configured to store the result information received by the communications interface; and
a processor configured to determine, based on progress information indicating progress of the work being performed by the tool and the result information stored in the storage device, what part of the result information the communications interface has failed to receive.

11. The external system of claim 10, wherein
the result information includes a measured value of the fastening torque associated with the work order number, and
the processor is configured to determine that the communications interface has failed to receive the measured value of the fastening torque associated with a specific work order number when the result information stored in the storage device lacks the measured value corresponding to the specific work order number despite the progress information indicating that the work associated with the specific work order number has been performed.

12. A determination method for use in a tool system, the tool system including a tool configured to perform a fastening operation and an external system, the tool being configured to transmit result information, including a fastening torque of the fastening operation and including a work order number, to the external system with progress of the work, the external system being configured to receive the result information from the tool and make a storage device store the result information, the determination method including:
determining, based on progress information indicating the progress of the work being performed by the tool and the result information stored in the storage device, what part of the result information the external system has failed to receive.

13. A non-transitory storage medium storing thereon a program designed to cause one or more processors to perform the determination method of claim 12.

14. The determination method of claim 12, wherein
the result information includes a measured value of the fastening torque associated with the work order number, and
the determining comprises determining that the external system has failed to receive the measured value of the fastening torque associated with a specific work order number when the result information stored in the storage device lacks the measured value corresponding to the specific work order number despite the progress information indicating that the work associated with the specific work order number has been performed.

* * * * *